(12) United States Patent
Fan et al.

(10) Patent No.: US 11,700,424 B2
(45) Date of Patent: Jul. 11, 2023

(54) DVB-S2 DOWNLINK ACM ALGORITHM ENHANCEMENT TO IMPROVE DATA THROUGHPUT

(71) Applicant: HUGHES NETWORK SYSTEMS, LLC, Germantown, MD (US)

(72) Inventors: Zengquan Fan, Germantown, MD (US); Tayyab Khan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/732,182

(22) Filed: Dec. 31, 2019

(65) Prior Publication Data
US 2021/0204027 A1  Jul. 1, 2021

(51) Int. Cl.
| | | |
|---|---|---|
| H04N 21/462 | (2011.01) | |
| H04N 21/442 | (2011.01) | |
| H04N 21/61 | (2011.01) | |
| H04N 21/44 | (2011.01) | |
| H04N 21/845 | (2011.01) | |

(52) U.S. Cl.
CPC ......... *H04N 21/4621* (2013.01); *H04N 21/44* (2013.01); *H04N 21/44209* (2013.01); *H04N 21/6162* (2013.01); *H04N 21/6193* (2013.01); *H04N 21/845* (2013.01)

(58) Field of Classification Search
CPC .............. H04N 21/4621; H04N 21/44; H04N 21/44209; H04N 21/6162; H04N 21/6193; H04N 21/845
See application file for complete search history.

(56) References Cited

U.S. PATENT DOCUMENTS

| | | | |
|---|---|---|---|
| 2004/0100911 A1* | 5/2004 | Kwan | H04L 1/0021 370/252 |
| 2004/0116142 A1 | 6/2004 | Wang et al. | |
| 2006/0198454 A1 | 9/2006 | Chung et al. | |
| 2008/0084829 A1 | 4/2008 | Visuri | |

(Continued)

FOREIGN PATENT DOCUMENTS

EP    1 191 719 A2    3/2002

OTHER PUBLICATIONS

International Search Report and Written Opinion issued in Application No. PCT/US20/67563, dated Mar. 26, 2021.

*Primary Examiner* — Randy A Flynn
(74) *Attorney, Agent, or Firm* — Potomac Technology Law, LLC

(57) ABSTRACT

An apparatus for determining a set of transmit parameters capable of improving and/or optimizing data throughput to a destination device. The apparatus includes an input circuit that receives a signal containing a plurality of data blocks for use by a plurality of devices. At least one of the data blocks is associated with the apparatus and encoded using a first set of transmit parameters. A transmit parameter processor determines a signal to noise ratio value for the received signal and a block error rate value for the at least one data block and at least one other data block encoded using a different set of transmit parameters. A processor generates a request for encoding subsequent data blocks destined to the apparatus using a second set of transmit parameters. A method and system are also disclosed.

20 Claims, 11 Drawing Sheets

(56) References Cited

U.S. PATENT DOCUMENTS

| | | | |
|---|---|---|---|
| 2009/0323792 A1* | 12/2009 | Zhou | H04L 1/0019 |
| | | | 375/224 |
| 2012/0300739 A1* | 11/2012 | Froberg | H04L 1/0006 |
| | | | 370/329 |
| 2013/0065631 A1* | 3/2013 | Lu | H04L 1/0003 |
| | | | 455/522 |
| 2013/0163444 A1* | 6/2013 | Tee | H04L 12/1868 |
| | | | 370/312 |
| 2016/0277096 A1* | 9/2016 | Wu | H04L 1/0058 |
| 2016/0278102 A1* | 9/2016 | Bontu | H04W 72/085 |
| 2016/0330638 A1 | 11/2016 | Koskinen et al. | |
| 2017/0052260 A1 | 2/2017 | Ramamurthy | |
| 2017/0353930 A1 | 12/2017 | Su et al. | |
| 2018/0191380 A1 | 7/2018 | Subramaniam et al. | |

* cited by examiner

DVB-S2 DOWNLINK ACM ALGORITHM ENHANCEMENT TO IMPROVE DATA THROUGHPUT

BACKGROUND INFORMATION

Modern communication technologies have enabled delivery of multimedia services (e.g., voice, data, video, etc.) to end-users over various delivery platforms, including terrestrial wire-line, fiber and wireless communications and networking technologies, and satellite communications and networking technologies. The relatively recent proliferation of mobile communications has spurred growth in the demand for such enhanced multimedia services over fixed and mobile communications networks (both terrestrial and satellite based). Developments in both fixed and mobile wireless communications have enabled consumers to remain connected without the need to have a wired connection. For example, satellite communication systems allow consumers to access voice and data services from virtually any global location. Such accessibility can be beneficial for consumers who are located in, or must travel to, areas that cannot be serviced by other (e.g. terrestrial) communication systems. As part of the growing demand, service providers of voice and communication networks are faced with requests for seemingly endless levels of bandwidth by consumers and content providers. Consumers utilize devices such as mobile phones, tablets, computers, etc. to obtain various types of content which can often require greater bandwidth and a higher quality of service than required only a short period of time earlier.

To address the growing demand, several standards organizations have enacted specifications associated with the transmission and reception of fixed and mobile wireless signal. One such standard, the Digital Video Broadcasting (DVB) standard DVB-S2 is a digital satellite transmission system standard covering a variety of data and multimedia services delivered over satellite communications systems. The DVB-S2 standard also covers various technological features, such as a flexible input stream adapter that can utilize Adaptive Coding and Modulation (ACM) functionality for optimizing channel coding and modulation on a frame-by-frame basis.

The ACM approach provides margin in the transmit parameter mapping to account for environmental variation and improved system availability during unstable environments, such as rain fade events, as well as margin for design variations of all the equipment. However, the margin can also introduce a reduced performance level for individual users in terms of data throughput, as well as a reduction in the overall performance of the communication system in terms of data capacity, when the margin is too conservative or not necessary based on the state of equipment and/or the environmental conditions. Based on the foregoing, there is a need to for improving the performance of the communication system by better utilizing the available transmission bandwidth of the signal to increase data throughput of the overall network transmission.

BRIEF SUMMARY

A method, apparatus, and system for determining a set of transmit parameters capable of improving and/or optimizing data throughput are disclosed. According to an embodiment, the method includes: receiving a signal including a plurality of data blocks for use by a plurality of devices, each of the data blocks being associated with one of the plurality of devices, at least one of the data block being associated with a selected device and encoded using a first set of transmit parameters; determining a signal to noise ratio value for the received signal; determining a block error rate value for the at least one data blocks and at least one other data block from the plurality of data blocks based on the determined signal to noise ratio value, the at least one other data block being encoded using a different set of transmit parameters; and requesting transmission of subsequent data blocks associated with the selected device, the subsequent data blocks being encoded using a second set of transmit parameters based, at least in part, on the determination of the block error rate.

According to an embodiment, the apparatus includes: an input circuit that receives a signal including a plurality of data blocks for use by a plurality of devices, each of the data blocks being associated with one of a plurality of devices including the apparatus, at least one of the data blocks being associated with the apparatus and encoded using a first set of transmit parameters; a transmit parameter processor, coupled to the receiving circuit, for determining a signal to noise ratio value for the received signal and determining a block error rate value for the at least one data block and at least one other data block from the plurality of data blocks based on the determined signal to noise ratio value, the at least one other data block being encoded using a different set of transmit parameters; and a processor coupled to the transmit parameter processor, the processor generating a request for transmission of subsequent data blocks associated with the apparatus, the subsequent data blocks being encoded using a second set of transmit parameters based, at least in part, on the determination of the block error rate.

According to an embodiment, the system includes: a satellite gateway that transmits a satellite signal including a plurality of data blocks, each of the data blocks being associated with one of a plurality of terminals; and a terminal comprising a processor configured to: receive the satellite signal and identify at least one data block from the plurality of blocks associated with the terminal device, the at least one data block being encoded using a first set of transmit parameters; determine a signal to noise ratio value for the received signal; determine a block error rate value for the at least one data block and at least one other data block from the plurality of data blocks based on the determined signal to noise ratio value, the at least one other data block being encoded using a different set of transmit parameters; and request transmission of subsequent data blocks, associated with the terminal device, using a second set of transmit parameters based, at least in part, on the determination of the block error rate for the at least one data block encoded with the first set of parameters and the at least other data block encoded with the different set of parameters.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and system for determining a set of transmit parameters for determining a set of transmit parameters capable of improving and/or optimizing data throughput for devices such as a terminal are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

The present embodiments are directed to improving bandwidth efficiency (e.g., data throughput, quality of service, etc.) in individual satellite terminals that use a common transmit parameter mapping mechanism, such as an ACM algorithm. In devices operating under certain conditions, the inherent operating margin built into the transmit parameter mechanism may be adjusted or reduced by utilizing additional information (i.e., codeblock error rate) to determine the set of transmit parameters for transmission of data to an individual terminal. By adding an additional mechanism for determining the performance of the terminal and allowing these individual satellite terminals the additional individual adjustment capability, bandwidth efficiency for the individual satellite terminals as well as for the entire network can be improved.

Figure 1:
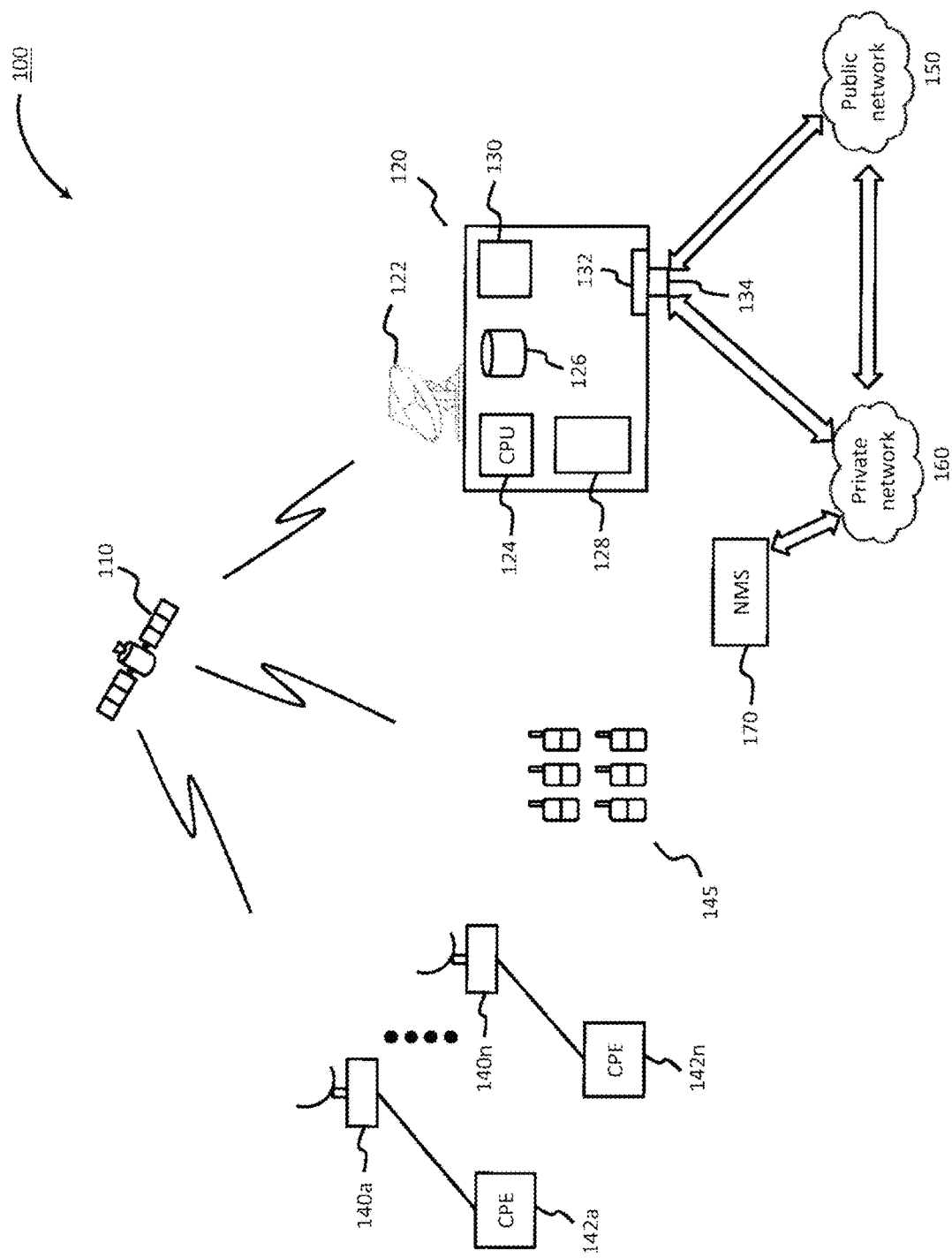
FIG. 1 is a diagram of a system capable of providing voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150, such as the internet, and/or its private network 160. Depending on the specific embodiment, the customer premise equipment 142 can be a desktop computer, laptop, tablet, cell phone, wired or wireless hub, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According to various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, central processing unit (CPU), etc.), and a data storage unit 126 (or storage unit). While generically illustrated, the processing unit 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
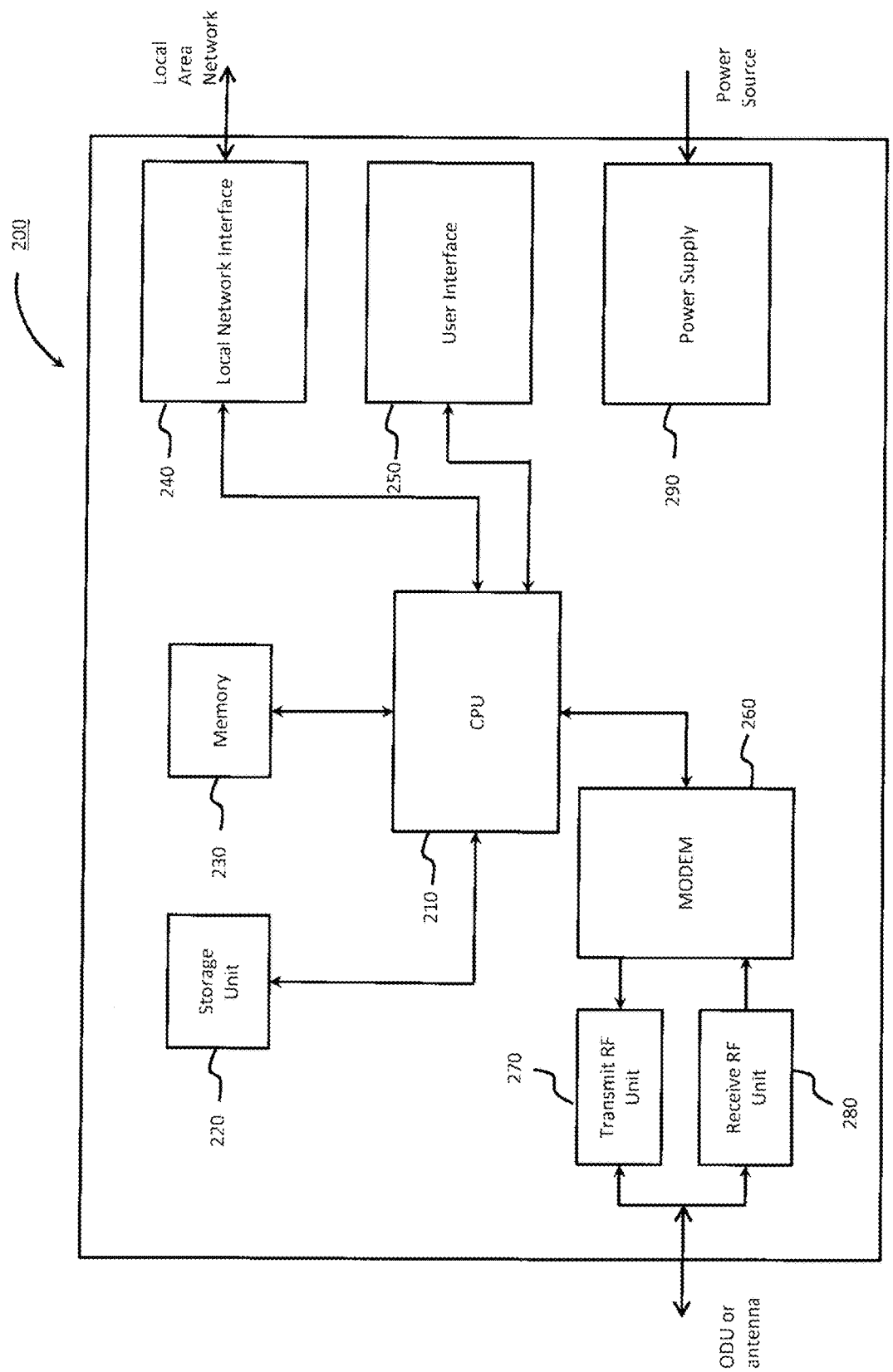
FIG. 2 is a diagram of a terminal capable of implementing a downlink enhancement for improving throughput, according to one embodiment.

FIG. 2 is a diagram of an exemplary configuration for a terminal 200 capable of implementing downlink enhancements, according to one embodiment. Depending on the specific implementation, terminal 200 can be configured to operate as a fixed satellite terminal 140 (e.g., VSAT), a mobile satellite terminal 145, a transportable terminal, etc. In terminal 200, a CPU 210 is coupled to a storage unit 220, a memory 230, a local network interface 240, a user interface 250, and a modem 260. Modem 260 is further coupled to a transmit radio frequency (RF) unit 270 and a receive RF unit 280. Although not shown, power supply 290 can be coupled to each of the blocks shown in terminal 200 that require local electrical power. It should be noted that terminal 200 can include various additional components which perform conventional operations. Such components are known to those skilled in the art, and omitted in order to provide better clarity and conciseness in describing the novel features of terminal 200.

CPU 210 can include one or more specifically built processing elements and/or general-purpose processors configured or programmed to perform specific tasks associated with the operation, control, and management of activity in terminal 200. Storage unit 220 can be any one of several large and/or removable storage elements including, but not limited to, magnetic disk, and optical disk. Memory 230 can be any type of electronic circuit or small scale-based storage elements including, but not limited to read-only memory (ROM), erasable electrically programmable ROM (EEPROM), random-access memory (RAM), non-volatile RAM (NVRAM), flash memory, or other similar memory technology. Storage unit 220 and/or memory 230 can be used to store instructions or software code used by CPU 210 and data associated with operations of terminal 200. Storage unit 220 can also be used for longer term storage of data and/or multimedia content transmitted and/or received through modem 260 or local network interface 240. Memory unit 230 can be used for shorter term or temporary storage of data and/or multimedia content needed for, or associated with, signal and data processing in terminal 200.

Local network interface 240 includes circuit elements configured for interfacing to one or more home networks and/or other similar local area networks (LANs). Local network interface 240 also includes interface components for connecting to the home networks and/or LANS either through a wired medium or wirelessly. Local network interface 240 receives data and/or multimedia content, along with processing instructions, from CPU 210 for delivery to devices such as CPEs 142 on the home and/or local area networks. For example, a home computer in a user's local home network employing Ethernet protocols can be interfaced to local network interface 240 through a registered jack (RJ) type 45 receptacle using category 5 (CAT 5) cable. Further, a user's cell phone can be connected wirelessly to local network interface 240 through an antenna (not shown) in order to utilize terminal 200 as a Wi-Fi signal router or hotspot.

User interface 250 can include a user input or entry mechanism, such as a set of buttons, a keyboard, or a microphone. User interface 250 can also include circuitry for converting user input signals into a data communication format to provide to processor 210. User interface 250 can further include some form of user notification mechanism to show device functionality or status, such as indicator lights, a speaker, or a display. User interface 250 can also include circuitry for converting data received from processor 210 to signals that may be used with the user notification mechanism.

Modem 260 performs all the functions necessary for modulating and demodulating a signal to/from transmit RF unit 270 and receive RF unit 280. These elements and/or functions can include, but are not limited to, digital signal conditioning, symbol mapping, demapping, data error correction encoding/decoding, and transport stream processing for interfacing data to and from the CPU 210. According to various embodiments, modem 260 can perform the modulating/demodulating functions independently or under control of the CPU 210. Transmit RF unit 270 processes the digital signal from modem 260 to form an analog signal for transmission through a satellite dish included as part of an outdoor unit (ODU) or an antenna (not shown). Receive RF unit 280 processes the analog signal received through the satellite dish or antenna to form a digital signal that is further processed in modem 260. The processing elements or functions in transmit RF unit 270 and receive RF unit 280 include, but are not limited to, signal amplification, filtering frequency up/downconversion, and analog to digital signal or digital to analog signal conversion.

In one embodiment, the received satellite signal, operating in appropriate frequency bands (e.g., C, Ka, Ku, etc.) is first block downconverted to the L band frequency range using very high frequency components in the ODU (not shown). The received satellite signal can be encoded using one or more set of transmit parameters, including a set of transmit parameters associated with terminal 200. The downconverted received signal in the L band frequency range is provided to receive RF unit 280. Receive RF unit 280 processes the downconverted received signal to provide a digital signal representing the received signal to modem 260. Modem 260 processes the digital signal to produce a transport stream containing data that is associated with or for delivery to one or more user devices on a local area network. The data is processed in CPU 210 and provided to local network interface 240 for delivery to the one or more devices. Further, data from the one or more devices is provided to CPU 210 through local network interface. CPU 210 processes the data to form a transport stream and provides the transport stream to modem 260. CPU 210 can also generate messages for the satellite gateway and add them to the transport stream, including requests to change the set of transmit parameters associated with terminal 200. Modem 260 processes the transport stream to produce a digital signal representing a signal for transmission as a satellite signal. The digital signal is provided to transmit RF unit 270. Transmit RF unit 270 processes the digital signal to form an analog signal in the L band frequency range. Transmit RF unit 270 provides the L band signal to the ODU for block upconversion and transmission as a satellite signal in the appropriate frequency bands. While FIG. 2 illustrates components such as modem 260, transmit RF unit 270, and receive RF unit 280, within terminal 200, it should be noted that various embodiments can allow for part or all of one or more of these components to be included in the ODU. Further, parts of one or more components may be combined or rearranged without altering the overall function and purpose of terminal 200. Thus, the specific arrangement shown in FIG. 2 should only be considered as illustrative, and is in no way intended to be restrictive.

Figure 3:
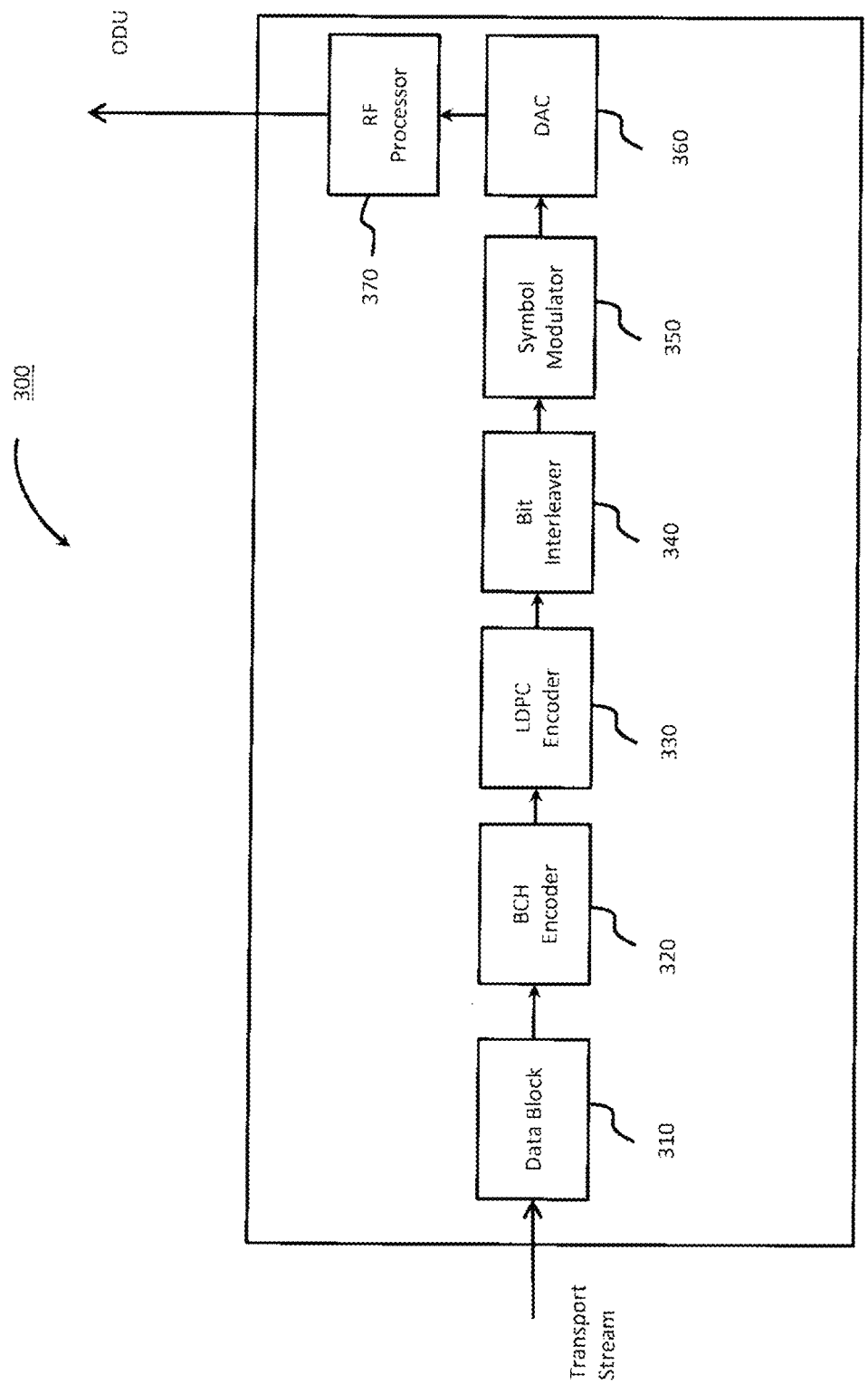
FIG. 3 is a diagram of a transmitter useable with the terminal of FIG. 2, according to one embodiment.

FIG. 3 is a diagram of an exemplary transmitter 300 that can be configured to operate as part of the terminal in FIG. 2, in accordance with one embodiment. In transmitter 300, data block 310 provides an interface for the received transport stream. Data block 310 is coupled to BCH encoder 320. BCH encoder 320 is coupled to LDPC encoder 330. LDPC encoder 330 is coupled to bit interleaver 340. Bit interleaver 340 is coupled to symbol modulator 350. Symbol modulator 350 is coupled to digital-to-analog converter (DAC) 360. DAC 360 is coupled to RF processor 370.

Data bock 310 receives the transport stream data and performs layer encapsulation to form baseband data frames or data blocks. Data block 310 can also insert information associated with the processing of the signal, such as terminal identification information and/or one or more transmit parameters used for processing or encoding portions of the signal. BCH encoder 320 processes the baseband data frames by adding additional redundant information based on or more of the BCH encoding algorithms used in conjunction with the signal transmission protocol. The additional redundant information, referred to as error correction information, can be used for correction of errors introduced by the transmission of the signal over the transmission channel or link during signal reception. LDPC encoder 330 further processes the BCH encoded data frames to add a second layer of redundant information, or error correction information, to the data frames for error correction using one or more LDPC algorithms. Bit interleaver 340 processes the data frames including the two layers of error correction to rearrange sections (e.g., bits) of the data frames with respect to location or position (i.e., in time) within the data frames to provide some additional error correction capability during reception to due short-term signal interference events. Symbol modulator 350 arranges the bits within the frames into symbols representing positions (i.e., in amplitude and phase or time) in a modulated signal waveform. DAC 360 converts the digital signal, arranged into symbols, to an analog signal, typically at or near the baseband frequency range. RF processor 370 filters, amplifies and upconverts the analog signal to produce a signal in the L band frequency range and provide the signal to an ODU for transmission.

Figure 4:
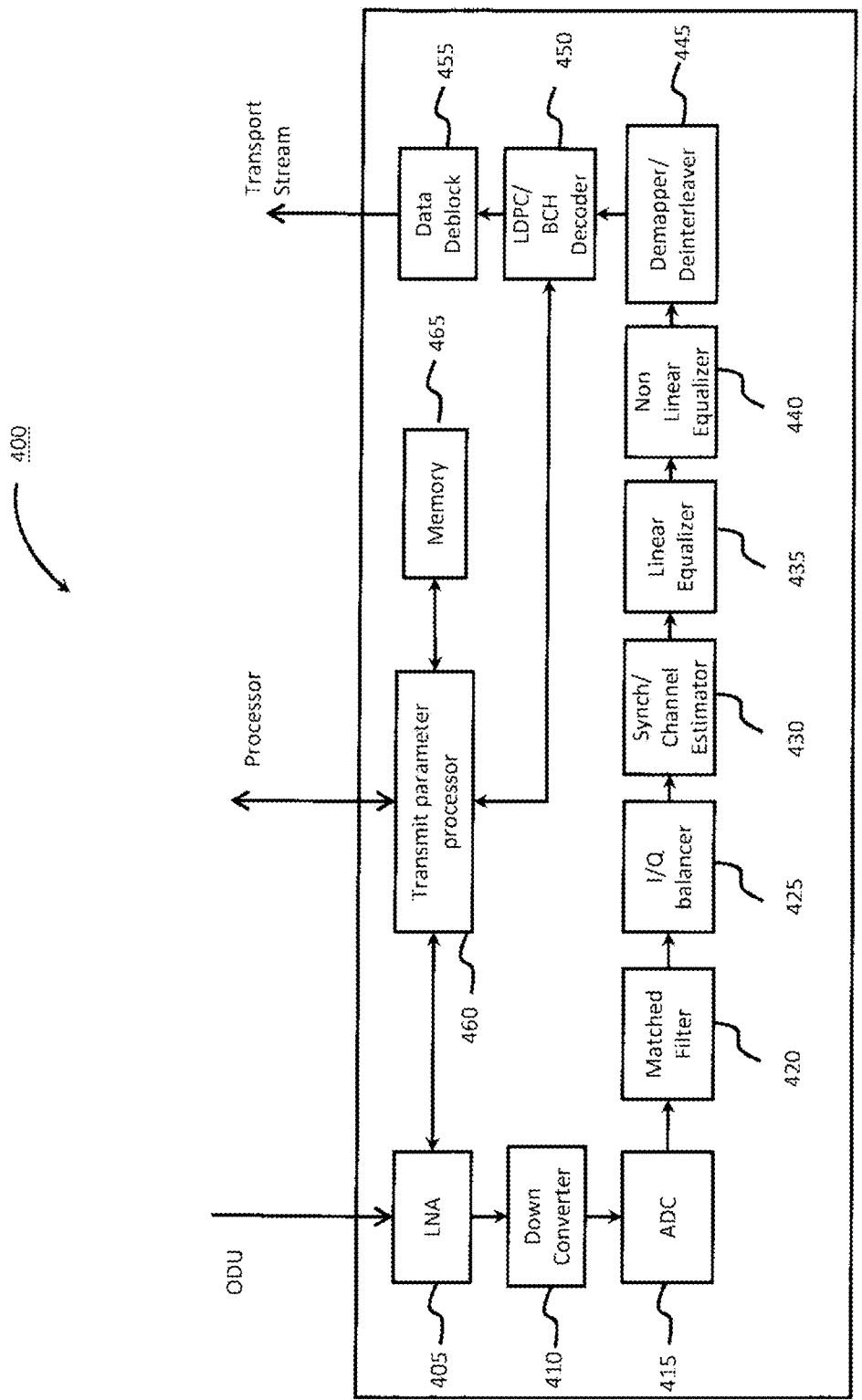
FIG. 4 is a diagram of a receiver useable with the terminal of FIG. 2, according to one embodiment.

FIG. 4 is a diagram of an exemplary receiver 400 that can be configured to operate as part of the terminal in FIG. 2, in accordance with one embodiment. In receiver 400, the received satellite signal from the ODU is provided as an input to low noise amplifier (LNA) 405. LNA 405 is coupled to downconverter 410. Downconverter 410 is coupled to analog-to-digital converter (ADC) 415. ADC 415 is coupled to matched filter 420. Matched filter 420 is coupled to in phase and quadrature phase component (I/Q) balancer 425. I/Q balancer 425 is coupled to synchronization (Synch)/channel estimator 430. Synch/channel estimator 430 is coupled to linear equalizer 435. Linear equalizer 435 is coupled to non-linear equalizer 440. Non-linear equalizer 440 is coupled to demapper/deinterleaver 445. Demapper/deinterleaver 445 is coupled to LDPC/BCH decoder 450. LDPC/BCH decoder 450 is coupled to data deblock 455 which provides a transport stream output signal. Further, transport parameter processor 460 is coupled to LNA 405 and LDPC/BCH decoder 450 as well as memory 465. Transport parameter processor can also include an interface to a processor in the terminal (e.g., CPU 210 as part of terminal 200 in FIG. 2).

LNA 405 receives the received signal in the L band frequency range, and filters and amplifies the signal to remove other signal energy not within the frequency range of a desired portion of the signal. Depending on the specific system implementation, the received signal in the L band frequency range can contain a plurality of individual signals arranged into channels or transponders. Downconverter 410 frequency converts the filtered signal, referred to as the desired signal (e.g., a channel or transponder), to a frequency range at or near baseband frequency range and can also provide additional filtering. Typically, not all of the plurality of individual signals contain data that is associated with, or intended for use by, the terminal that includes receiver 400. Data in a signal that is associated with, or intended for use by, the terminal can be based on requests for that data made through user devices connected to the terminal (e.g., through local network interface 240 in FIG. 2), referred to as desired data in the desired signal. ADC 415 converts the downconverted signal to a digital signal representative of the downconverted signal. In some embodiments, more than one LNA 405, downconverter 410, and ADC 415, referred to collectively as a desired signal tuner, can be included for receiving and tuning a plurality of desired signals from the received signal.

Matched filter 420 provides a defined filtering characteristic in order to properly shape the time domain representation of the symbols in the digital signal. I/Q balancer 425 adjusts the relative position of the recovered symbols in both amplitude and phase or time based on an expected position of the symbols within a defined constellation map for encoding the modulation type in the received signal. Synch/channel estimator 430 detects specific portions of the digital signal to perform symbol timing synchronization and determine one or more of the transmit parameters used as part of encoding the transmitted signal. In some cases, synchronization information as well as transmit parameter information can be included in specific portion of the signal or a part of a preamble or signal header.

Synch/channel estimator 430 also processes the digital signal to generate and maintain a continuous updated estimate of the amplitude and phase response of the digital signal as compared to a perfect, ideal, or expected received signal. The transmission of the signal from a satellite gateway uplink (e.g., RFT 122 included in gateway 120 in FIG. 1) up to a satellite in space (e.g., satellite 110) and back to the terminal on the earth can introduce a number of signal impairments that may additionally vary in time, including, but not limited to, nonstochastic noise, signal reflections and echoes, non-linear signal attenuation, and the like. The estimate generated by synch/channel estimator 430 allows receiver 400 to compensate, correct, or mitigate the effects of the impairments introduced into the signal. The estimate can be generated and maintained in one or both of the time domain and frequency domain. Linear equalizer 435 corrects, to the extent possible, the presence of impairments in the digital signal based on the estimate provided from synch/channel estimator 430. Linear equalizer 435 processes the digital signal using a linear combination of scaled and delayed versions of the input digital to attempt to invert or cancel the presence of the impairment from the digital signal, often referred to as equalization. Non-linear equalizer 440 further corrects, to the extent possible, any remaining impairment errors still present in the digital signal after equalization in linear equalizer 435. Non-linear equalizer 440 corrects for those errors that cannot be addressed through only corrections of amplitude and/or phase performed in linear equalizer 435 without introducing an instability to the output response. Non-linear equalizer 440 can include additional feedback and feedforward conditional decision loops in order to ensure stability in the response while correcting for the effects or presence of the remaining portion of impairments in the digital signal.

Demapper/deinterleaver 445 demodulates the digital signal waveform by demapping the symbols into strings of bits. Demapper/deinterleaver 445 further deinterleaves the bits, rearranging bits with respect to position or location in a manner that reverses the interleaving process applied at the transmitter (e.g., in bit interleaver 340 in FIG. 3). LDPC/BCH decoder 450 processes the deinterleaved bitstream first processing the redundant information inserted by the LDPC encoding process to identify and correct any correctable errors in the bitstream and then processing the redundant information inserted by the BCH encoding process to identify and correct any additional correctable errors in the bitstream. Depending on the amount or rate of error correction applied as part of BCH and LDPC encoding, not all errors present in the bitstream can be identified and/or corrected by LDPC/BCH encoder 450. Data deblock 455 processes the decoded bitstream (with or without remaining errors), arranged in data blocks, to regenerate an estimate of the original source data as part of a transport stream. Data deblock 455 provides the transport stream to a processor, such as CPU 210, for further processing and distribution. The transport stream includes desired data intended or destined for, or associated with, the terminal and/or user devices interfaced to the terminal. In addition, the transport stream can also include data that is not intended or destined for, or associated with, the terminal and/or user devices. Other processing, either in receiver 400 or in other elements of the terminal, can identify, parse, and/or discriminate the desired data from the undesired data in the transport stream.

LNA 405 can perform further processing to determine signal energy or level as well as noise energy or level. The determined values for signal energy and noise energy can be processed to generate signal characteristics for the received signal including, but not limited to, signal to noise ratio (SNR) values, average SNR values over a specific time interval, the variance values for the average SNR values, energy per symbol to noise power spectral density level (Es/No) values, and the like. LNA 405 can include circuitry for processing the determined signal and noise level to generate the signal characteristics and provide the characteristics to transmit parameter processor 460. Alternatively, transmit parameter processor 460 can generate the signal characteristics from the signal and noise levels provided by LNA 405. LDPC/BCH decoder 450 can also provide datastream characterization information associated with the error correction process as part of decoding the received digital bitstream. The datastream characterization information can include, but is not limited to, number of data blocks received that were encoded using a particular set of transmit parameters, the data blocks received that were encoded using a particular set of transmit parameters and that still contain errors, and the like. Transmit parameter processor 460 can process the information provided from LNA 405 and LDPC/BCH decoder 450 as part of determining a different set of transmit parameters that can be used for transmitting future data as part a desired signal intended for use by the terminal. Memory 465 can store any intermediated values as part of the processing and determination performed in transmit parameter selector 460. Memory 465 can also store any mapping that is created or defined based on a relationship between the transmit parameters, and characterization information provided by LNA 405 and LDPC/BCH decoder 450.

Figure 5:
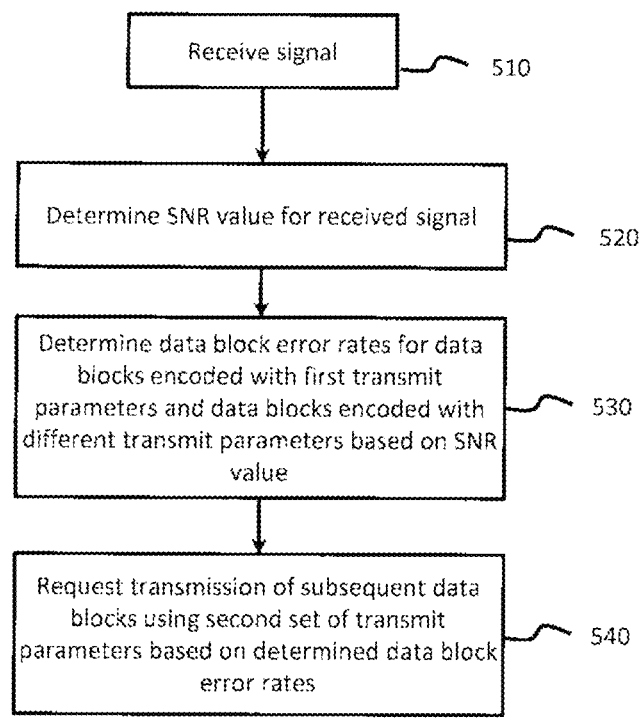
FIG. 5 is a flowchart of a process for requesting a change to the transmit parameters of a transmitted signal, according to one embodiment.

FIG. 5 is a flowchart of an exemplary process 500 for requesting a change to the transmit parameters of a transmitted signal, according to one embodiment. Process 500 is described in relation to operation as part of terminal 200 described in FIG. 2. Process 500 can equally be applied to other stationary, transportable, and portable type terminal devices, such as terminals 140 and portable terminals 145 described in FIG. 1. At step 510, a signal is received at terminal 200. The signal is transmitted through a satellite network from a gateway (e.g., satellite gateway 200 described in FIG. 1). More particularly, the gateway transmits the signal on an outroute direction to different terminals along a bent pipe path facilitated by the satellite. The signal includes a plurality of data blocks for use by a plurality of terminals and/or devices. The data blocks can be encoded with different sets of transmit parameters in any arrangement. Further, each of the data blocks can include some form of identifier indicating its destination terminal. As such, each of the data blocks is associated with a terminal and/or device, including terminal 200, and the blocks associated with a terminal are encoded with a set of transmit parameters for that terminal. For instance, five consecutive data blocks in the received signal that are associated with terminal 200 can be encoded using a first set of transmit parameters. The next ten consecutive data blocks in the received signal can be associated with another terminal and encoded using a different set of transmit parameter, and so on.

At step 520, an SNR value is determined for the received signal. The SNR value can be determined based on measured signal energy, symbol energy (e.g., Es/No), bit energy (e.g., Eb/No), a similar received signal characteristic, etc. The SNR value can also be determined as an average of any of the above determined bases taken over a period of time (e.g., average SNR). The range for the period of time can be between 100 milliseconds and 10 seconds with a nominal value of 5 seconds. The SNR value can also include an additional value computed or determined from the SNR, such as the variance of the SNR value. According to an embodiment, the SNR value can be determined by CPU 210 based on inputs from receive RF unit 280. According to other embodiments, the SNR value can also be determined using one or more components in a receiver circuit (e.g., LNA 405 and transmit parameter processor 460 in FIG. 4).

At step 530, a block error rate value for the data blocks in the received signal and associated with terminal 200, and the block error rates for data blocks in the received signal and associated with other terminals or devices are determined based on the results of determining the signal to noise ratio value for the signal, at step 520. According to at least one embodiment, the block error rate value can be determined by calculating the ratio of the number of data blocks that contain at least one error that was not corrected after performing error correction to a total number of data blocks to which error correction was performed for each set of data blocks that have been encoded using a different set of transmit parameters. The ratio can be calculated over a predetermined period of time or for a predetermined number of data blocks. Furthermore, the ration can be expressed as an absolute value or as a percentage. Values for the block error rate can range, for example, from 0.0 (i.e., no errors) to 0.01 (1 error block for every 100 blocks received. The block error rate value can be determined by CPU 210 based on inputs from receive RF unit 280. The block error rate value can also be determined using one or more components in a receiver circuit (e.g., LDPC/BCH decoder 450 and transmit parameter processor 460 in FIG. 4).

At step 540, a request is generated in terminal 200 to transmit subsequent data blocks using a new or second set of transmit parameters. The request can be generated based, at least in part, on the determination of block error rate values, at step 530. The determination, at step 530, can be used to identify this second set of transmit parameters that can improve performance (e.g., either data throughput or quality of service) of terminal 200. For example, the block error rate value for data blocks encoded using the first set of transmit parameters for terminal 200 and the block error rate value for data blocks encoded using the next most robust set of transmit parameters that are available for transmission of data blocks in the signal can be compared against one or more threshold block error rate values. Depending on the results of this comparison, the next most robust set of transmit parameters can be identified as the new or second set of transmit parameters in the request. Further, the request generated, at step 540 can be based on the determination of the SNR value, at step 520, based on a set of transmit parameters selected or identified as a result of that determination. The request generated, at step 540, can also be based on a combination of the determination of SNR, at step 520, identifying a first different set of transmit parameters as described above, and the further determination of block error rate, at step 530, identifying yet another different set of transmit parameters to use as the second set of parameters.

According to additional embodiments, some or all the steps of process 500 can be performed and used to update the set of transmit parameters used for encoding data blocks on a periodic basis. Depending on the specific design requirements, the time period for repeating process 500 can based on factors including, but not limited to, the frequency of transmission of data blocks associated with terminal 200 or the data blocks encoded with the same set of transmit parameters as data blocks associated with terminal 200 and the types of modulation most frequently used for encoding the transmitted signal.

Figure 6:
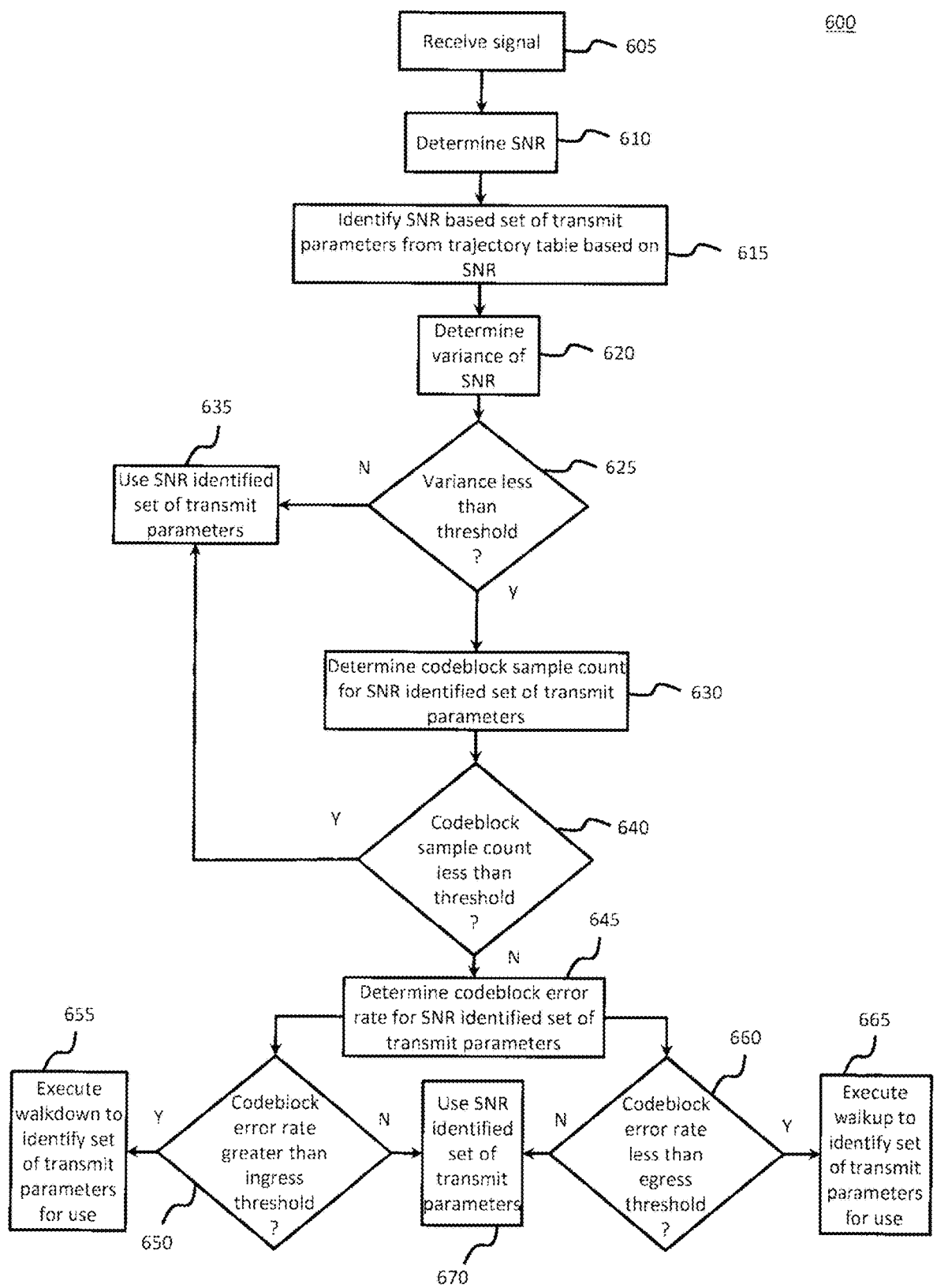
FIG. 6 is a flowchart of a process for determining a different set of transmit parameters, according to at least one embodiment.

FIG. 6 is a flowchart of an exemplary process 600 for determining improved transmit parameters, according to one embodiment. Process 600 is described in relation to features of terminal 200 (described in FIG. 2) and receiver 400 (described in FIG. 4). Process 600 can equally be applied to other stationary, transportable, and portable type terminal devices, such as terminals 140 and portable terminals 145 described in FIG. 1. Further, process 600 can be used in conjunction with one or more of the steps described for process 500 described in FIG. 5. For example, the determined and identified set of transmit parameters from process 600 can be used as the different or second set of transmit parameters included in the request for transmission, at step 540.

At step 605, a signal is received at terminal 200. As described above in FIG. 5, the signal can include a plurality of data blocks encoded using different sets of transmit parameters for use by a plurality of terminals and/or devices, including terminal 200. At step 610, an SNR value is determined for the received signal. The SNR value can be determined based on measured signal energy, symbol energy (e.g., Es/No), bit energy (e.g., Eb/No), or a similar received signal characteristic, including averaging as described above. The SNR value can be determined in a receive circuit, such as LNA 405 or in a processor (e.g., transmit parameter processor 460) based on inputs from the receive circuit.

At step 615, the SNR determined at step 610 is compared to a set of SNR threshold values in a parameter trajectory table to identify the set of transmit parameters that are appropriate for the SNR value of the received signal determined at step 610. In some embodiments, the parameter trajectory table can include a single SNR threshold value associated with each of the different sets of possible transmit parameters. The set of transmit parameters can be chosen based on the SNR threshold value closest to, based on a predetermined criteria, the SNR value for the received signal determined at step 610. In other embodiments, more than one SNR threshold value can be associated with each of the different sets of possible transmit parameters, and can be used to create a range of SNR values that use the set of possible transmit parameters. The identified set of parameters are stored in a memory (e.g., memory 230 in FIG. 2) and can be retrieved and used as the second set of parameters as part of a request for transmission of subsequent data blocks in process 500 depending on further evaluation through process 600. In some embodiments, the identified set of parameters, at step 615, are stored in memory only if the identified set of parameters identified are different from the set of parameters used for encoding the currently received data blocks.

At step 620, the variance value for the determined SNR value, at step 610, is determined. The variance value, at step 620, can be determined in a receive and/or input circuit, such as LNA 405 or in a processor (e.g., transmit parameter processor 460) based on inputs from the receive circuit. The variance value, at step 620, can provide an indication of the stability of the received signal conditions at the terminal including, but not limited to, environment, weather, atmospheric, or galactic conditions, interference from other signal sources (e.g., nearby satellites), equipment malfunction in the network, etc. If the variance value exceeds a defined threshold variance value, determining or identifying a set of transmit parameters based on shorter time datastream characterization information, such as block error rate values for data blocks in the signal, may yield unreliable or unexpected results. The threshold variance value can be determined during operation or pre-defined as part of the original process for provisioning terminal 200 (e.g., in memory 230). For example, such values can be stored in terminal 200 (e.g., in memory 230) during factory testing or onsite activation. The threshold variance value can also be updated periodically or dynamically changed based data accumulated during the operation of terminal 200. Depending on the specific implementation, the threshold variance value can range from 1.5 dB to 2.5 dB with 2.0 dB as nominal.

At step 625, a comparison or determination is made as to whether the variance value is greater than a threshold variance value. If, at step 625, the variance value is determined to be greater than the threshold variance value, then control passes to step 635. The set of transmit parameters identified at step 615 are maintained in memory and can be used as the second set of transmit parameters as described above. No further steps in process 600 are necessary. If, at step 625, the variance value is not greater (i.e., less than or equal to) than the threshold variance value, then control passes to step 630. The number of data blocks that were encoded using the set of transmit parameters identified, at step 615, is determined. The codeblock sample count can be determined, for example, in the LDPC/BCH decoder 450 or a processor (e.g., transmit parameter processor 460) based on datastream characterization information provided by LDPC/BCH decoder 450. In some cases, the number of data blocks that were encoded using the identified set of parameters includes some or none of the data blocks associated with the terminal (e.g. terminal 200). In some cases, the number of data blocks received in the signal that were encoded using the identified set of parameters includes only data blocks associated with the terminal, depending on the identified set of transmit parameters and the types of data blocks in the signal. Further, the codeblock sample count can be reset (e.g., to a value of zero) periodically to keep the sample count value relatively fresh with respect to a period of time.

At step 640, a comparison or determination is made as to whether the codeblock sample count is less than a codeblock sample count threshold. The codeblock sample count threshold can be determined, for example, during operation or pre-defined as part of the original design and stored in terminal 200 (e.g., in memory 230). The codeblock sample count threshold can also be updated periodically, or dynamically changed, based on data accumulated during the operation of terminal 200. If, at step 640, the codeblock sample count is determined to be less than the codeblock sample count threshold, then the set of previously identified transmit parameters is maintained and no further steps in process 600 are necessary.

If, at step 640, the codeblock sample count is not less than (i.e., greater than or equal to) the codeblock sample count threshold, then control passes to step 645. The error rate for the data blocks encoded using the same set of transmit parameters identified at step 615 is determined. The codeblock error rate can be determined by identifying the number of data blocks encoded with the identified set of transmit parameters that still contain at least one error in the data after error correction is complete, and forming a ratio of the number of data blocks identified with at least one error divided by the total number of data blocks for the identified set of transmit parameters. According to an embodiment, the codeblock error rate can be determined in the LDPC/BCH decoder 450 or in a processor (e.g., transmit parameter processor 460) based on datastream characterization information provided by LDPC/BCH decoder 450. Further, the codeblock error rate can be reset (e.g., to a value of zero) periodically to keep the sample count value relatively fresh with respect to a period of time.

Following the determination of codeblock error rate, at step 645, two separate comparison or determinations are made. At step 650, a comparison is made to determine whether the codeblock error rate is greater than a first, or upper, codeblock error rate threshold (i.e., the ingress codeblock error rate threshold for the set of transmit parameters). Further, at step 660, a comparison is made to determine whether the codeblock error rate is less than a second or lower codeblock error rate (i.e., the egress codeblock error rate threshold for the set of transmit parameters). The ingress codeblock error rate threshold and the egress codeblock error rate threshold can be determined, for example, during operation or pre-defined as part of the original design and stored in terminal 200 (e.g., in memory 230). The ingress codeblock error rate threshold and the egress codeblock error rate threshold can also be updated periodically, or dynamically changed, based on data accumulated during the operation of terminal 200.

If, at step 650, the codeblock error rate is greater than the ingress codeblock error rate threshold, then control passes to step 655. A walkdown determination is executed to determine a different set of transmit parameters from incrementally more robust sets of available transmit parameters based on block error rates for data blocks received in the signal and encoded with those sets of transmit parameters. The walkdown determination can be used to compare codeblock error rates and thresholds for the identified set of transmit parameters and the next most robust set of transmit parameters, and can be continued through all available sets of transmit parameters or until no further improvement is determined or no different set of transmit parameters is identified.

If, at step 660 the codeblock error rate is less than the egress codeblock error rate threshold, then, at step 665, a walkup determination is executed to determine a different set of transmit parameters from incrementally less robust the sets of available transmit parameters based on codeblock error rates for data blocks received in the signal and encoded with those sets of transmit parameters. The walkup determination can be used to compare codeblock error rates and thresholds for the identified set of transmit parameters and the next least robust set of transmit parameters and can be continued through all available sets of transmit parameters or until no further improvement is determined or no different set of transmit parameters is identified. The walkdown determination executed, at step 655, and walkup determination, at step 665, can be used to identify a set of transmit parameters that increase a performance aspect of the terminal, either in terms of data throughput or in terms of quality of service, based on reducing the normative or standard margins present in the identification of the set of transmit parameters based only on a SNR value, at step 615. A set of transmit parameters identified as a result of executing a walkdown, at step 655, or a walkup, at step 665, can be used to update and replace the set of transmit parameters identified, at step 615, and stored in memory. This set of parameters, identified at step 655 or step 665, can further be retrieved and used as the second set of parameters as part of a request for transmission of subsequent data blocks in process 500.

The ingress codeblock error rate threshold and egress codeblock error rate threshold form a threshold range for codeblock error rate. This causes either the walkup determination, at step 665 or the walkdown determination, at step 655, to be executed when the codeblock error rate for the identified set of transmit parameter is outside of the threshold range. If, at step 650, the codeblock error rate for the identified set of transmit parameters is not greater than the ingress codeblock error rate threshold control passes to step 670 and the identified set of transmit parameters is maintained and used. No further steps in process 600 are necessary. Similarly, if the codeblock error rate is not less than the egress codeblock error rate threshold at step 660, then the identified set of transmit parameters is maintained and used. No further steps in process 600 are necessary.

Figure 7:
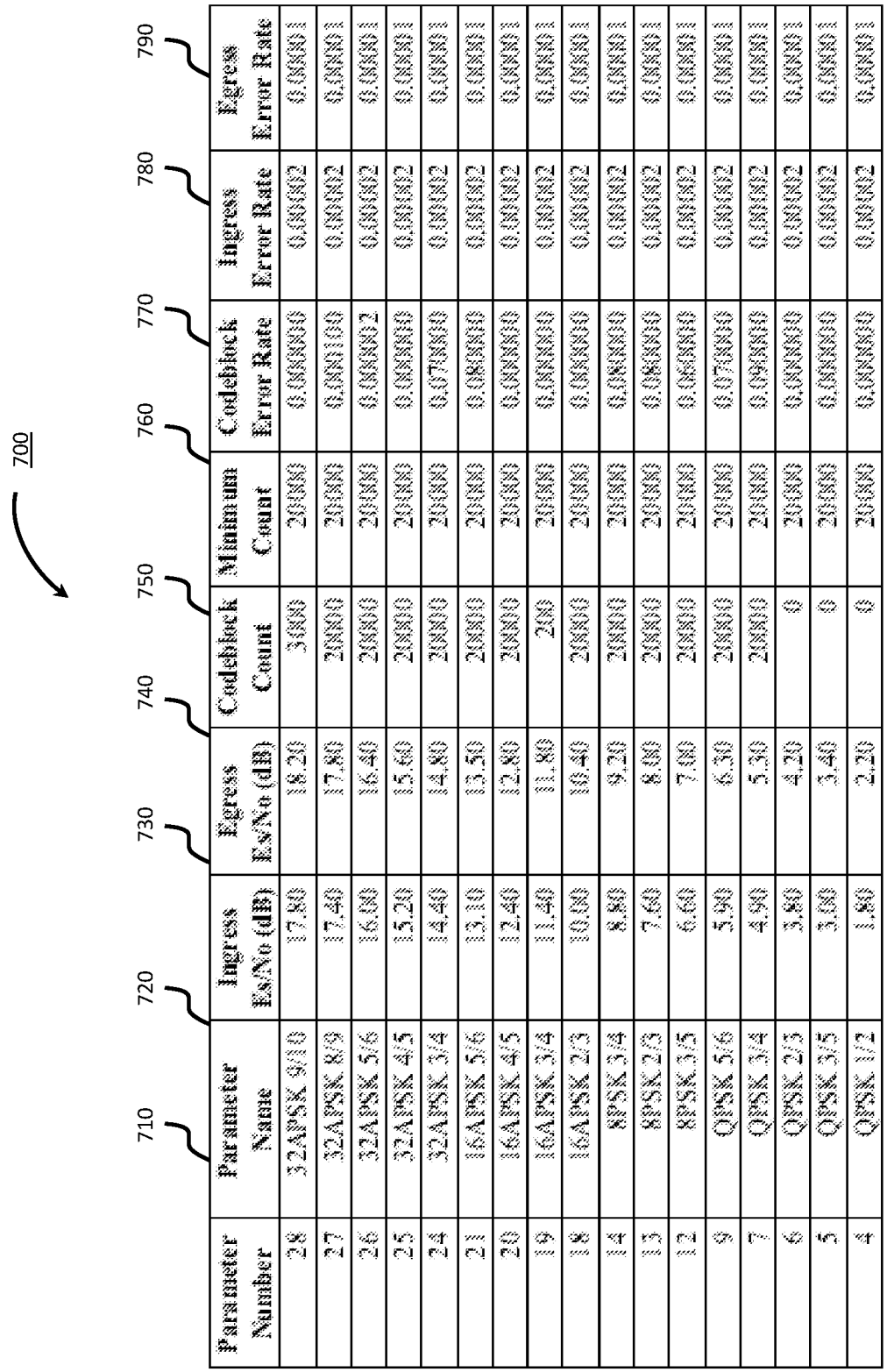
FIG. 7 is a diagram of an extended trajectory table containing entries for transmit parameters and received signal characteristics, according to one or more embodiments.

FIG. 7 is a diagram of an exemplary extended trajectory table 700 containing entries for transmit parameters and received signal characteristics, according to one embodiment. The extended trajectory table 700 contains a parameter number column 710, which is used to reference (or identify) different rows (or entries). According to the illustrated embodiment, entries in extended trajectory table 700 are indexed in order of increasing robustness for the sets of transmit parameters. The first entry in parameter number column 710 contains the highest value (i.e., 28) and corresponds to the least robust set of transmit parameters, while the final entry contains the lowest value (i.e., 4) and corresponds to the most robust set of transmit parameters. While extended trajectory table 700 is illustrated with seventeen (17) entries, it should be noted that the number of entries can be increased or decreased depending on the specific system requirements. The entries shown in extended trajectory table 700 should therefore be considered as illustrative, and in no way restrictive.

According to the illustrated embodiment, the extended trajectory table 700 also includes a parameter name column 720 which contains descriptive names associated with the sets of transmit parameters used for encoding the data block(s) in the signal. Each row of the parameter number column 710 has a combination of at least different modulation type and error correction rate identified in column 720. For example, the illustrated modulation types include quadrature phase shift keying (QPSK), eight PSK (8 PSK), 16 amplitude and phase shift keying (APSK), 32 APSK. The illustrated error correction rates include 1/2, 3/5, 2/3, 3/4, 4/5, 5/6, 8/9, and 9/10. Depending on the specific embodiment, additional or fewer transmit parameters can be included in the extended trajectory table 700. Furthermore, different combinations of modulation types and error correction rates can be utilized in extended trajectory table 700.

Extended trajectory table 700 also includes threshold values for an Ingress Es/No column 730 and an Egress Es/No column 740 that can be used in conjunction with determining the proper transmit parameters based only on signal to noise ratio value. According to the illustrated embodiment, rows of the extended trajectory table 700 also correspond to a decreasing order of a signal to noise ratio threshold value for each parameter number. Extended trajectory table 700 further includes a codeblock count column 750 which stores values corresponding to the current count for data blocks encoded with each of the sets of transmit parameters and a minimum count column 760 used for the threshold count value for the data blocks as described above. Extended trajectory table 700 further includes a codeblock error rate column 770 for indicating the current error rate for the data blocks encoded with each of the sets of transmit parameters. Extended trajectory table 700 also includes threshold values for an ingress error rate column 780 and egress error rate column 790 used in conjunction with the walkup and walkdown steps included in the process for selecting a set of parameters described above.

According to the illustrated embodiment, the row values in the minimum count column 760, ingress error rate column 780 and egress error rate column 790 are the same. In other embodiments, the values in one or more of the rows can be different, such as to apply some weighting on the movement between the rows as part of either the walkup (step 665) or walkdown (step 655) in FIG. 6. Further, other elements for signal characteristics of the received signal and/or datastream characterization information can be used in place of, or in addition to, SNR, codeblock count, and codeblock error rate as illustrated in extended trajectory table 700. According to further embodiments, the extended trajectory table 700 can be stored in a memory (e.g., memory 465 in FIG. 4 or memory 230 in FIG. 2) or storage unit (e.g., storage unit 220 in FIG. 2) in the terminal (e.g. terminal 200 in FIG. 2). Values for the extended trajectory table 700 can also be transmitted and/or transferred to the terminal and stored prior to operation. For example, the values can be transferred from removable storage media or transmitted to the terminal from an external source, such as the gateway.

Figure 8:
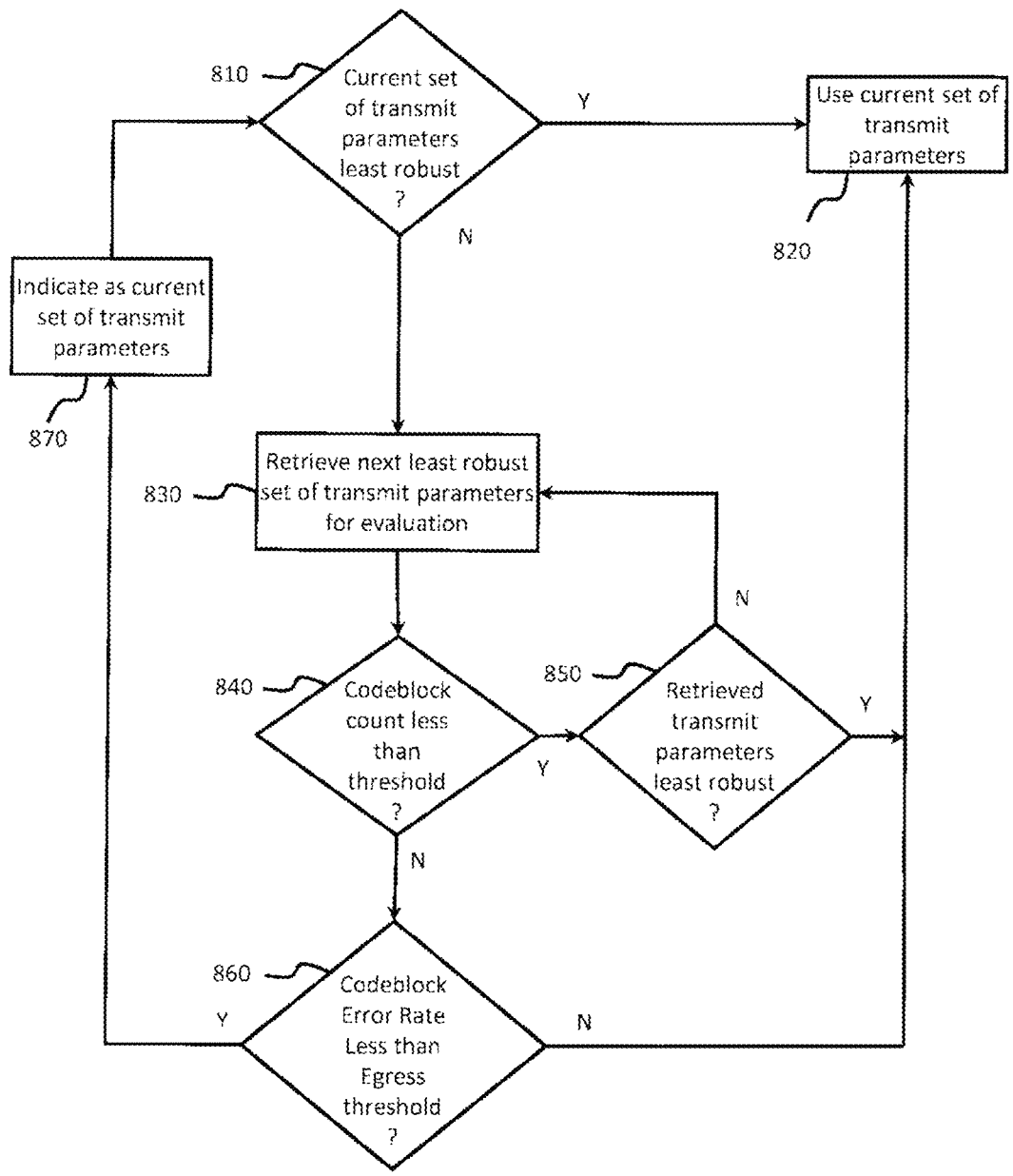
FIG. 8 is a flowchart of a process for selecting a less robust set of transmit parameters, according to one embodiment.

FIG. 8 is a flowchart of a process 800 for selecting a less robust set of transmit parameters, according to one or more embodiments. Process 800 is similar to the walkup determination executed, at step 665, as part of process 600. Process 800 can be used as part of, or as an addition to, other processes, including process 600 illustrated in FIG. 6 and process 500 illustrated in FIG. 5. Further, process 800 can be implemented in one or more terminals, such as terminal 200 in FIG. 2 or terminals 140 and portable terminals 145 in FIG. 1. Process 800 can be used to determine and identify a set of transmit parameters that can improve the data throughput or bit rate efficiency in a terminal implementing the process when used for encoding the data blocks associated with the terminal in the received signal.

At step 810, a comparison or determination is made as to whether the currently identified set of transmit parameters is the least robust set of transmit parameters available for encoding the transmitted signal. According to at least one embodiment, the current set of transmit parameters can be obtained as part of another process (e.g., process 600) and input to process 800 at step 810. For example, the least robust set of transmit parameters can be the top row in extended trajectory table 700 as illustrated in FIG. 7. If it is determined, at step 810, that the currently identified set of transmit parameters is the least robust available, then no further sets of parameters need to be evaluated. At step 820, the currently identified set of transmit parameters are maintained and used. The currently identified set of transmit parameters, if updated by process 800 can be passed back into another process, such as process 600 and 500. For example, the currently identified set of transmit parameters can be used as the second set of parameters in request for future transmission, at step 540 of process 500.

If, at step 810, the currently identified set of transmit parameters is not the least robust set of available transmit parameters, then, at step 820, the datastream characterization information for a less robust set of transmit parameters (e.g., based on the rows in extended trajectory table 700 in FIG. 7) is retrieved for evaluation as a new set of transmit parameters. According to an embodiment, the immediately preceding entry in extended trajectory table 700 can be retrieved. According to other embodiments, the retrieved entry can be two or more rows prior within the extended trajectory table 700. At step 840, it is determined whether the codeblock count for the data blocks encoded with the retrieved set of transmit parameters is less than the codeblock count threshold. The comparison can be performed, for example, in a manner similar to that described above at step 640 in process 600. If, at step 840, the code block count is less than the code block count threshold, then control passes to step 850. A determination is made as to whether the retrieved set of transmit parameters is the least robust set of parameters available for encoding the transmitted signal. If it is determined, at step 850, that the retrieved set of transmit parameters not the least robust set of parameters, then control returns to step 830 to retrieve the next least robust set of transmit parameters for evaluation.

If, at step 840, the code block count for the retrieved set of transmit parameters is not less than (i.e., greater than or equal to) the code block count threshold, then control passes to step 860. A determination is made as to whether the codeblock error rate for the datablocks encoded with the retrieved set of transmit parameters is less than the egress (i.e., lower) threshold (e.g., column 790 in FIG. 7). The comparison can be performed in a manner similar to that described above at step 660 in process 600. If it is determined, at step 860, that the codeblock error rate is less than the egress threshold, then the retrieved set of transmit parameters is designated as the currently identified set of transmit parameters at step 870. The retrieved set of transmit parameter would also the set of transmit parameters that had been currently identified. Process 800 returns to step 810 to determine if the new currently identified set of transmit parameters are the least robust. If it is determined, at step 850, that the retrieved set of transmit parameters are the least robust set of parameters or, at step 860, that the codeblock error rate for the retrieved transmit parameters is not less than (i.e., greater than or equal to) the egress threshold, then control passes to step 820 where the current set of transmit parameters is used and maintained.

Figure 9:
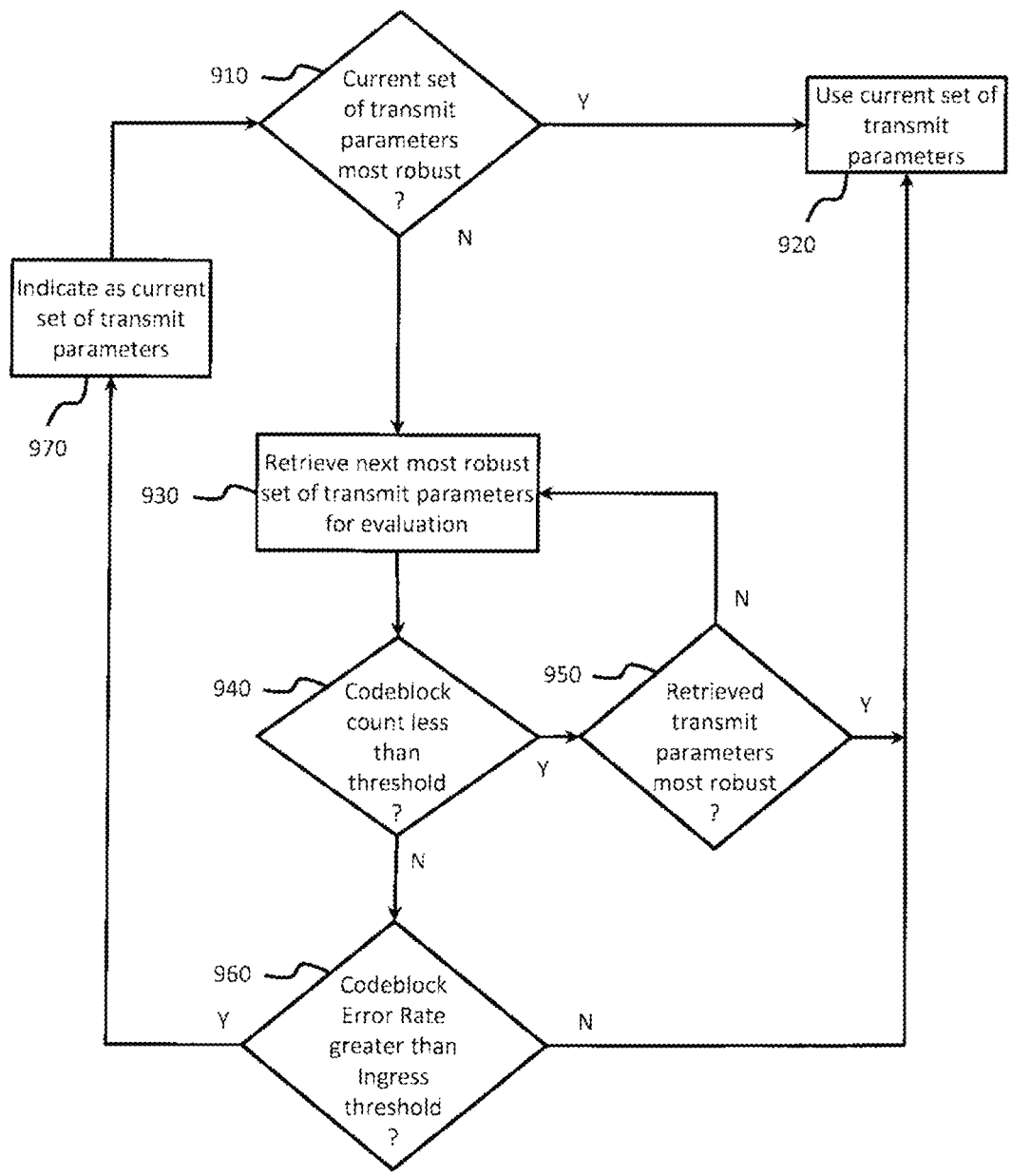
FIG. 9 is a flowchart of a process for selecting a more robust set of transmit parameters, according to one embodiment.

FIG. 9 is a flowchart of a process for selecting a more robust set of transmit parameters, according to one or more embodiments. Process 900 is similar to the walkdown determination executed, at step 655, as part of process 600. Process 900 can be used as part of, or as an addition to, other processes, including process 600 illustrated in FIG. 6 and process 500 illustrated in FIG. 5. Further, process 900 can be implemented in one or more terminals, such as terminal 200 in FIG. 2 or terminals 140 and portable terminals 145 in FIG. 1. Process 900 can be used to determine and identify a set of transmit parameters that can improve the improve the effective bit rate efficiency, based on fewer requests for resends due to errors in the datastream in a terminal implementing the process when used for encoding the data blocks associated with the terminal in the received signal.

At step 910, a comparison or determination is made as to whether the currently identified set of transmit parameters is the most robust set of transmit parameters available for encoding the transmitted signal. According to at least one embodiment, the current set of transmit parameters can be obtained as part of another process (e.g., process 600) and input to process 900 (e.g., at step 810). For example, the most robust set of transmit parameters can be the bottom row in extended trajectory table 700 as illustrated in FIG. 7. If, at step 910, the currently identified set of transmit parameters is the most robust, then no further sets of parameters need to be evaluated. At step 920, the currently identified set of transmit parameters are maintained and used. The currently identified set of transmit parameters, if updated by process 900 can be passed back into another process, such as process 600 and 500. For example, the currently identified set of transmit parameters can be used as the second set of parameters in request for future transmission, at step 540 of process 500.

If, at step 910, the currently identified set of transmit parameters are not the most robust set of available transmit parameters, then, at step 920, the datastream characterization information for the next most robust set of transmit parameters (e.g., based on the rows in extended trajectory table 700 in FIG. 7) is retrieved for evaluation as a new set of transmit parameters. At step 940, a comparison is made to determine whether the codeblock count for the data blocks encoded with the retrieved set of transmit parameters in the signal is less than the codeblock count threshold. The comparison can be performed, for example, in a manner similar to that described above at step 640 in process 600. If, at step 940, the code block count is determined to be less than the code block count threshold, then control passes to step 950. A further comparison is made to determine whether the retrieved set of transmit parameters is the most robust set of parameters available for encoding the transmitted signal, in a manner similar to step 910. If it is determined, at step 950, that the retrieved set of transmit parameters is not the most robust set of parameters, then process 800 returns to step 830 to retrieve the next least robust set of transmit parameters for evaluation.

If it is determined, at step 940, that the code block count for the retrieved set of transmit parameters is not less than (i.e., greater than or equal to) the code block count threshold, then control passes to step 960. A determination is made, at step 960, as to whether the codeblock error rate for the data blocks encoded with the retrieved set of transmit parameters in the signal is greater than the ingress (i.e., upper) threshold (e.g., column 780 in FIG. 7). The comparison can be performed in a manner similar to that described above at step 650 in process 600. If, at step 960, the codeblock error rate is determined to be greater than the ingress threshold, then the retrieved set of transmit parameters is designated as the currently identified set of transmit parameters. This is indicated at step 970. Additionally, the newly retrieved set of transmit parameters would replace the set of transmit parameters that had been currently identified. Process 900 continues to step 910 to determine if the new currently identified set of transmit parameters is the most robust. If the retrieved set of transmit parameters is determined to be the most robust set of parameters at step 950, or the codeblock error rate for the retrieved transmit parameters is not greater than the ingress threshold (step 960), then the current set of transmit parameters are used and maintained. This is indicated at step 920.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described encoders, modulators, encoders, filters, transmit RF unit, receive RF unit, modem, terminals, receivers, transmitters, transceivers, gateway, baseband components, fault management unit, etc. Additionally, such hardware can be interfaced to connect and/or facilitate communication between different components. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die or distributed across multiple components. Such exemplary hardware for implementing the described features are detailed below.

Figure 10:
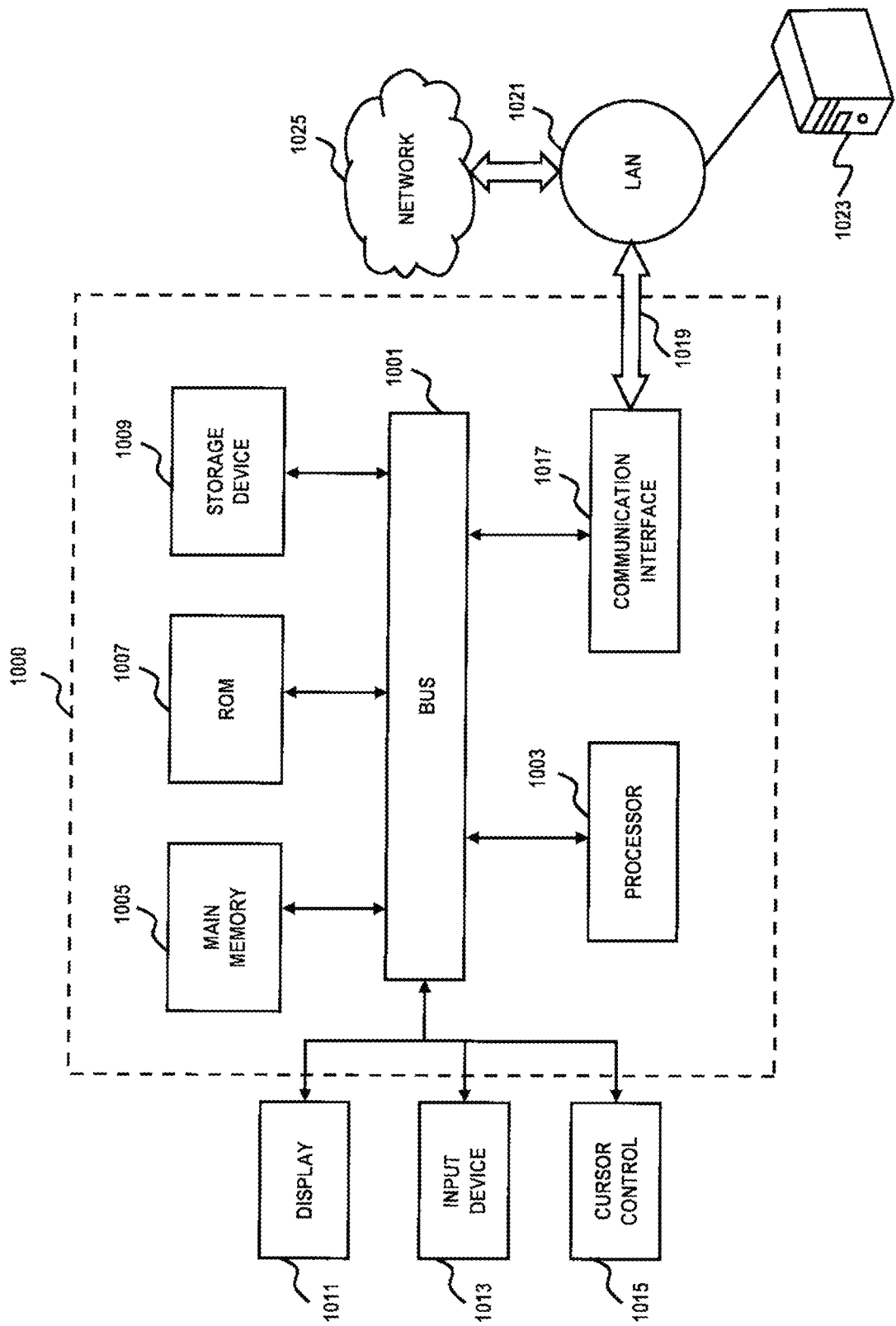
FIG. 10 is a diagram of a computer system that can be used to implement various exemplary features and embodiments.

FIG. 10 is a diagram of a computer system 1000 that can be used to implement various exemplary features and embodiments. The computer system 1000 includes a bus 1001 or other communication mechanism for communicating information and a processor 1003 coupled to the bus 1001 for processing information. The computer system 1000 also includes main memory 1005, such as (RAM), dynamic RAM (DRAM), synchronous dynamic RAM (SDRAM), double data rate SDRAM (DDR SDRAM), DDR2 SDRAM, DDR3 SDRAM, DDR4 SDRAM, etc., or other dynamic storage device (e.g., flash RAM), coupled to the bus 1001 for storing information and instructions to be executed by the processor 1003. Main memory 1005 can also be used for storing temporary variables or other intermediate information during execution of instructions by the processor 1003. The computer system 1000 may further include a ROM 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a light emitting diode (LED) or other flat panel displays, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011. Additionally, the display 1011 can be touch enabled (i.e., capacitive or resistive) in order to facilitate user input via touch or gestures.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a High Definition Multimedia Interface (HDMI), etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 such as a wide area network (WAN) or the Internet. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network (s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Non-volatile media can further include flash drives, USB drives, micro secure digital (SD) cards, etc. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., digital versatile disk (DVD), DVD read write (DVD RW), Blu-ray), or any other medium from which a computer can read.

Figure 11:
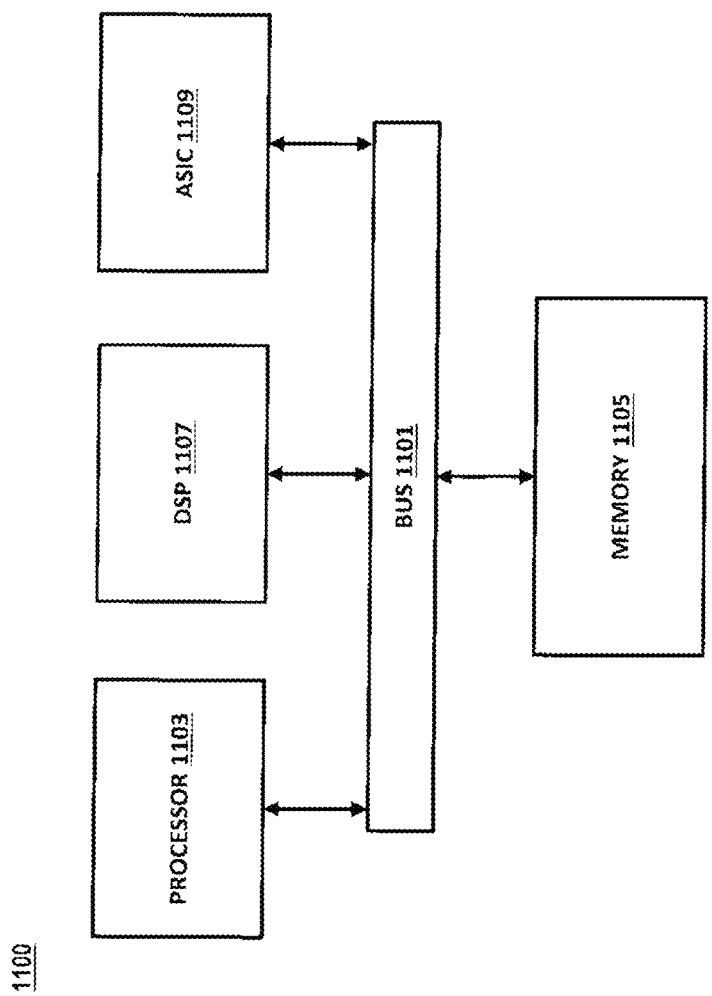
FIG. 11 is a diagram of a chip set that can be used to implement various exemplary features and embodiments.

FIG. 11 illustrates a chip set 1100 upon which features of various embodiments may be implemented. Chip set 1100 is programmed to implement various features as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of the figures.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to perform specialized functions not easily performed by a general purpose processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1105 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   receiving, by a first terminal of a plurality of terminals for a communications system, a signal including a plurality of data blocks, each of the data blocks including an identifier which associates the data block with one of the plurality of terminals, and at least one of the data blocks being associated with the first terminal and encoded based on a first set of transmit parameters;
   determining a signal to noise ratio value for the received signal;
   determining a block error rate value for the at least one data block associated with the first terminal and for at least one other data block of the plurality of data blocks based on the determined signal to noise ratio value, the at least one other data block being encoded based on a different set of transmit parameters;
   determining, by the first terminal, whether use of the first set of transmit parameters optimizes signal reception for the first terminal based, at least in part, on the block error rate value for the at least one data block associated with the first terminal; and
   requesting, by the first terminal, that transmission of subsequent data blocks associated with the first terminal be encoded based on a second set of transmit parameters when it is determined that the signal reception is not optimized for the first terminal with the use of the first set of transmit parameters.

2. The method of claim 1, wherein the signal to noise ratio value is an average value of a set of signals to noise ratio values determined over a time interval.

3. The method of claim 1, wherein the method further comprises:
   determining a variance value for the signal to noise ratio of the received signal and whether the variance value for the received signal is less than a threshold variance value; and
   determining a block error rate for the at least one data block and the at least one other data block when it is determined that the variance value is less than the threshold variance value.

4. The method of claim 1, wherein determining the block error rate value comprises at least one of determining a block count value indicating a number of blocks encoded based on the same set of transmit parameters for the at least one data block and determining a block count value for the at least one other data block.

5. The method of claim 4, wherein the determining the block error rate comprises at least one of determining if the block count value for the at least one data block exceeds a threshold block count value and determining if the block count value for the at least one other data block exceeds the threshold block count value.

6. The method of claim 1, wherein determining the block error rate comprises at least one of determining whether the block error rate value for the at least one data block is outside of a value range bounded by a lower block error rate threshold value and an upper block error rate threshold value and whether the block error rate value for the at least one other data block is outside of the value range bounded by the lower block error rate threshold value and the upper block error rate threshold value.

7. The method of claim 6, wherein the subsequent data blocks are requested to be transmitted to the first terminal encoded based on the second set of transmit parameters when it is determined that one or more of the block error rate value for the at least one data block and the block error rate value for the at least one other data block is outside of the value range.

8. The method of claim 1, wherein the first set of transmit parameters, the second set of transmit parameters, and the different set of transmit parameters are included in a lookup table containing entries corresponding to sets of transmit parameters available for encoding the signal.

9. The method of claim 8, wherein the sets of transmit parameters are arranged within the lookup table in increasing order of signal to noise ratio threshold values associated with each set of transmit parameters.

10. The method of claim 1, wherein the at least one other data block is encoded based on a set of transmit parameters based on the determined signal to noise ratio value.

11. An apparatus of a first terminal for a communications system comprising:
a receiver configured to receive a signal including a plurality of data blocks, each of the data blocks including an identifier which associates the data block with one of a plurality of terminals including the first terminal, at least one of the data blocks being associated with the first terminal and encoded based on a first set of transmit parameters; and
at least one processor; and
wherein the at least one processor is configured to determine a signal to noise ratio value for the received signal,
wherein the at least one processor is configured to determine a block error rate value for the at least one of the data blocks associated with the first terminal and for at least one other data block of the plurality of data blocks based on the determined signal to noise ratio value, the at least one other data block being encoded based on a different set of transmit parameters,
wherein the at least one processor is configured to determine whether use of if the first set of transmit parameters optimizes signal reception for the first terminal based, at least in part, on the block error rate value for the at least one data block associated with the first terminal, and
wherein the at least one processor is configured to generate a request that transmission of subsequent data blocks associated with the first terminal be encoded based on a second set of transmit parameters when it is determined that the signal reception is not optimized for the first terminal with the use of the first set of transmit parameters.

12. The apparatus of claim 11, wherein the at least one processor is configured to determine a variance value for the signal to noise ratio of the received signal and whether the variance value for the received signal is less than a threshold variance value, and to determine a block error rate for the at least one data block and for the at least one other data block when it is determined that the variance value is less than the threshold variance value.

13. The apparatus of claim 11, wherein the at least one processor is configured to determine at least one of a block count value indicating several blocks encoded based on the same set of transmit parameters for the at least one data block and a block count value for the at least one other data block.

14. The apparatus of claim 13, wherein the at least one processor is configured to determine whether at least one of the block count value for the at least one data block and the block count value for the at least one other data block exceeds a threshold block count value.

15. The apparatus of claim 11, wherein the at least one processor is configured to determine whether at least one of the block error rate value for the at least one data block and the block error rate for the at least one other data block is outside of a value range bounded by a lower block error rate threshold value and an upper block error rate threshold value.

16. The apparatus of claim 15, wherein the subsequent date blocks are requested to be transmitted to the first terminal encoded based on the second set of transmit parameters when it is determined that one or more of the block error rate value for the at least one data block and the block error rate value for the at least one other data block is outside of the value range.

17. The apparatus of claim 11, wherein the first set of transmit parameters, the second set of transmit parameters, and the different set of transmit parameters are included in a lookup table containing entries corresponding to sets of transmit parameters available for encoding the signal.

18. The apparatus of claim 17, wherein the sets of transmit parameters are arranged within the lookup table in increasing order of signal to noise ratio threshold values associated with each set of transmit parameters.

19. The apparatus of claim 11, wherein the at least one other block is encoded based on a set of transmit parameters based on the determined signal to noise ratio value.

20. A communications system comprising:
a gateway configured to transmit a signal including a plurality of data blocks, each of the data blocks including an identifier which associates the data block with one of a plurality of terminals; and
a first terminal comprising a receiver and at least one processor, wherein at least one of the data blocks is associated with the first terminal and encoded based on a first set of transmit parameters; and
wherein the receiver of the first terminal is configured to receive the signal from the gateway,
wherein the at least one processor of the first terminal is configured to identify the at least one data block associated with the first terminal,
wherein the at least one processor of the first terminal is configured to determine a signal to noise ratio value for the received signal,
wherein the at least one processor of the first terminal is configured to determine a block error rate value for the at least one of the data blocks associated with the first terminal and for at least one other data block of the plurality of data blocks based on the determined signal to noise ratio value, the at least one other data block being encoded based on a different set of transmit parameters,
wherein the at least one processor of the first terminal is configured to determine whether use of the first set of transmit parameters optimizes signal reception for the first terminal based, at least in part, on the block error rate value for the at least one data block associated with the first terminal, and
wherein the at least one processor of the first terminal is configured to generate a request that transmission of subsequent data blocks associated with the first terminal be encoded based on a second set of transmit parameters when it is determined that the signal reception is not optimized for the first terminal with the use of the first set of transmit parameters.

\* \* \* \* \*